United States Patent [19]

Imamura

[11] 4,299,587
[45] Nov. 10, 1981

[54] V-BELT

[75] Inventor: Junji Imamura, Kobe, Japan

[73] Assignee: Mitsuboshi Belting Ltd., Kobe, Japan

[21] Appl. No.: 48,404

[22] Filed: Jun. 14, 1979

[30] Foreign Application Priority Data

Feb. 8, 1979 [JP] Japan .............................. 54-15626[U]

[51] Int. Cl.³ .............................................. F16G 5/08
[52] U.S. Cl. ................................... 474/262; 474/263;
474/267
[58] Field of Search ....................... 74/231 P, 232, 233,
74/237; 474/261, 262, 263, 268, 267; 198/847

[56] References Cited

U.S. PATENT DOCUMENTS

| | | | |
|---|---|---|---|
| 3,353,419 | 11/1967 | Richmond | 74/233 |
| 3,416,383 | 12/1968 | Jensen et al. | 74/233 |
| 3,478,613 | 11/1969 | Waugh et al. | 74/233 |
| 3,818,741 | 6/1974 | Terhune | 74/233 |
| 3,872,735 | 3/1975 | Hnatek | 74/231 R |
| 3,941,005 | 3/1976 | Gardiner et al. | 74/233 |
| 3,944,060 | 3/1976 | Hartmann | 198/847 |
| 3,981,206 | 9/1976 | Miranti, Jr. et al. | 74/233 |
| 4,024,773 | 5/1977 | Hartman et al. | 474/263 |
| 4,083,261 | 4/1978 | Speer et al. | 474/262 |
| 4,188,832 | 2/1980 | Henderson | 74/233 |

Primary Examiner—C. J. Husar
Assistant Examiner—Conrad Berman
Attorney, Agent, or Firm—Sughrue, Mion, Zinn, Macpeak & Seas

[57] ABSTRACT

A raw edge type rubber V-belt having a tension section, a compression section and a tensile member layer extending in the longitudinal direction of the belt and embedded between the tension section and the compression section. A single or plural plies of rubbered fabric highly stretchable in the longitudinal direction of said belt are, in laminated form, embedded in the lower portion of the compression section with a rubber layer on each fabric, and bonded to the upper surface of the tension section. Short fibers are mixed in a compression rubber layer under the tensile member layer and in a tension rubber layer on the tensile member layer in such a manner that the short fibers extend in the lateral direction of the belt.

9 Claims, 12 Drawing Figures

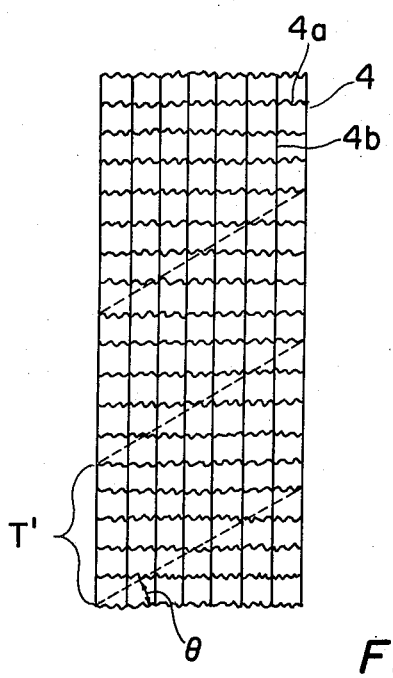
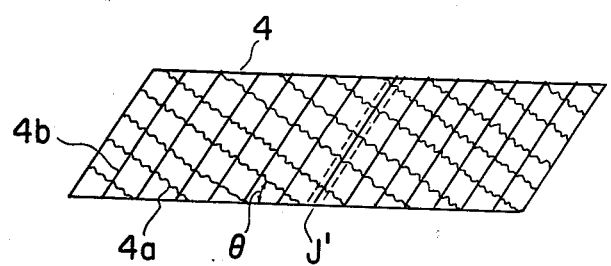
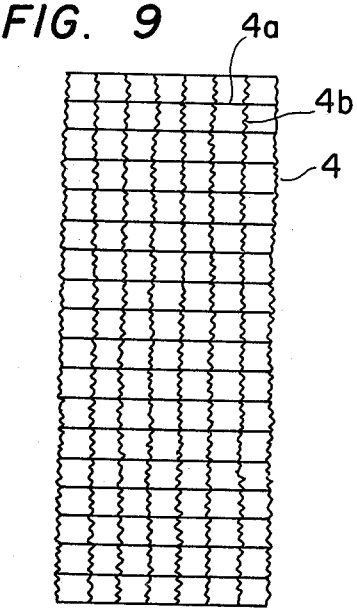
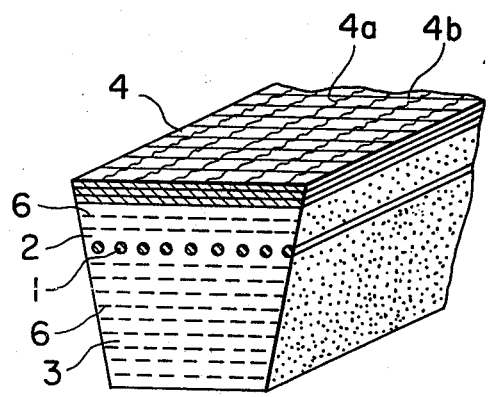
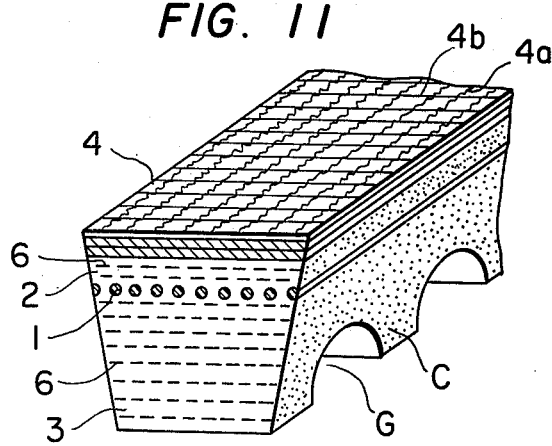
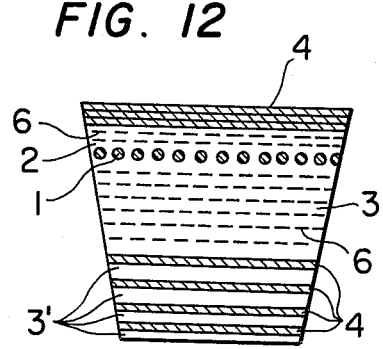

V-BELT

BACKGROUND OF THE INVENTION

This invention relates to an improvement of structure of a power transmission V-belt.

In a raw edge type rubber V-belt, according to this invention, a single or plural plies of plain weave fabric or twill weave fabric obtained by weaving crimped nylon yarns subjected to wooly treatment and cotton yarns, nylon yarns or polyester yarns are embedded in the lower portion of the compression section or bonded to the upper surface of the tension section. Alternatively, the fabric is provided for both the lower portion of the compression section and the upper surface of the tension section. The crimped nylon fiber high in stretchability extends in the longitudinal direction of the belt while the cotton yarns, nylon yarns or polyester yarns high in rigidity extend in the lateral direction of the belt. Short fibers are mixed in a compression rubber layer under the tensile member layer and in a tension rubber layer on the tensile member layer in such a manner that the short fibers extend in the lateral direction of the belt.

Hence, the flexibility in the longitudinal direction of the belt is increased to prevent the belt from being cracked. The rigidity in the lateral direction of the belt is increased to improve the side pressure durability thereof.

In general, the following conditions are required for a V-belt adapted to transmit power by the frictional force created between the belt and the pulley:

(1) The belt has a high flexibility and is rarely cracked, and (2) the belt is not deformed by the side pressure which is caused when the belt is in the pulley groove.

A variety of belts have been proposed to satisfy the above-described requirements for a V-belt. With respect to the condition (1), a V-belt in which a plain weave fabric obtained by weaving cotton yarns, i.e., warps and wefts in such a manner that the warps and wefts form a cross angle of 90 degrees is embedded in bias form has been proposed. A V-belt in which a fabric obtained by weaving cotton yarns, i.e., warps and wefts in such a manner that the warps and wefts form a wide cross angle of 120 degrees is embedded in bias form has been provided, in order to increase the flexibility of the belt. These V-belts have been put into practical use.

The first mentioned V-belt has an elongation at break of about 60%, and therefore is disadvantageous in that the stretchability in the bias direction is low. Accordingly, the belt has a tendency to crack. On the other hand, the latter V-belt has elongation at break of about 110%, and therefore the crack-resistance of the belt is improved to some extent. However, it is not always sufficient. That is, if the latter mentioned V-belt is bent reversely by a tension pulley, it may be cracked.

None of the two V-belt 90° and 120° in cross angle can meet the condition (2) described above. That is, since the warps and wefts of the fabric are oblique with respect to the lateral direction of the belt, the belt is deformed by the side pressure applied thereto when run. As a result, it may be dropped in the pulley (as much as about 1.0 mm). Thus, the two V-belts are not always satisfactory in performance.

In order to improve the side pressure durability, a V-belt has been proposed in which cords are inserted in the lateral direction of the belt. However, this V-belt is also disadvantageous in that, since the belt is bent by the pulley at all times, the upper and lower surfaces of the belt are liable to be cracked.

SUMMARY OF THE INVENTION

Accordingly, an object of this invention is to eliminate all of the above-described difficulties accompanying a conventional V-belt.

The foregoing object and other objects of the invention have been achieved by the provision of a raw edge type rubber V-belt in which a plain weave fabric or a twill weave fabric obtained by weaving crimped nylon yarns subjected to wooly treatment and cotton yarns, nylon yarns or polyester yarns is arranged in the lower portion of a compression rubber layer and/or on a tension rubber layer in such a manner that the crimped nylon yarns high in stretchability extend in the longitudinal direction of the belt. The elongation at break is about 150%, and therefore that V-belt according to the invention is excellent in crack-resistance when compared with conventional V-belts.

The invention will be described with respect to the drawings and the description of the preferred embodiment that follows.

BRIEF DESCRIPTION OF THE DRAWINGS

FIG. 7 is a plan view of a woven fabric similar to that in FIG. 3, showing another method of cutting the fabric;

FIG. 8 is a plan view showing the fabric in FIG. 7, which has been rearranged to be used in the V-belt according to the invention;

FIG. 9 is a plan view showing another example of the woven fabric employed in the V-belt according to the invention; and FIGS. 10 to 12 are perspective views, with parts cut away, and a cross sectional view showing other examples of the V-belt according to the invention, respectively.

DESCRIPTION OF THE PREFERRED EMBODIMENTS

Figure 1:
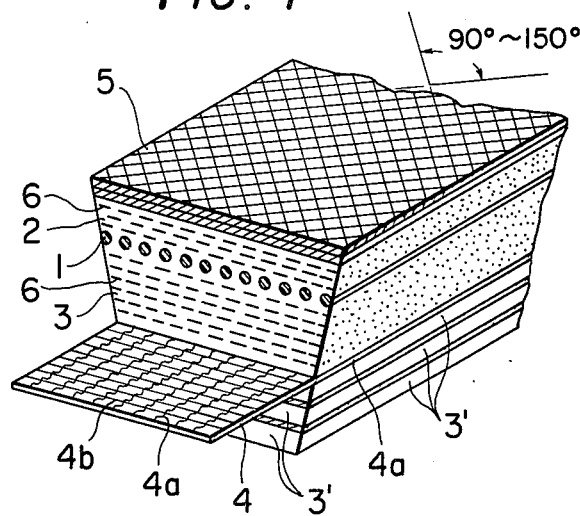
FIG. 1 is a perspective view, with parts cut away, showing one example of a V-belt according to the invention.

A first example of the V-belt according to the invention is shown in FIG. 1, in which reference numeral 1 designates a rope-shaped tensile member of fibers such as polyester fibers, nylon fibers or aromatic polyamide fibers (trade name "Kevlar") high in strength. Reference numeral 2 is a tension rubber layer and reference numeral 3 denotes a compression rubber layer. In order to increase the side pressure durability of the belt, 10 to 30 parts by weight of short fibers 6, 2 to 10 mm in length, are mixed in the rubber layers 2 and 3 in such a manner that the short fibers extend in the lateral direction of the belt. The short fibers are obtained by cutting natural fibers such as cotton fibers, synthetic fibers such as nylon fibers, vinylon fibers and rayon fibers, artificial fibers, or non-organic fibers such as glass fibers. A single or plural plys (usually two to five plys) of rubbered fabric 5 are bonded in lamination to the upper surface of the tension rubber layer 2 in such a manner that the warps and wefts of the rubbered fabric are extended obliquely with respect to the longitudinal direction of the belt. The rubbered fabric 5 is such that the warps and wefts form a wide cross angle of 90 to 150 degrees.

A few plies of special rubbered fabric 4 different from the above-described bias fabric 5 are embedded in lamination in the lower portion 3' of the compression rubber layer 3 (hereinafter referred to as "a lower rubber layer 3'" when applicable). The special rubbered fabric 4 forms one of the specific facets of the invention.

The rubbered fabric 4 can improve the stretchability in the longitudinal direction of the belt and the side pressure durability in the lateral direction of the belt. This is done in cooperation with the tension rubber layer 2 and the compression rubber layer 3 in which the short fibers 6 are arranged laterally of the belt.

The longitudinal yarns 4a are crimped nylon yarns subjected to wooly treatment, while the lateral yarns 4b are cotton yarns, ordinary nylon yarns or polyester yarns high in rigidity. A plain weave fabric or a twill weave fabric is obtained by weaving these yarns. The fabric 4 is subjected to adhesion treatment, and then one or two surfaces of the fabric are covered with the rubber layers 3' having a predetermined thickness. The fabric 4 thus treated is arranged to form 90 degrees with the longitudinal direction of the belt. The number of plys of rubbered fabric 4 depends on the thickness of the compression rubber layer 3 of the belt. It is, in general, two to six plies.

Figure 3:
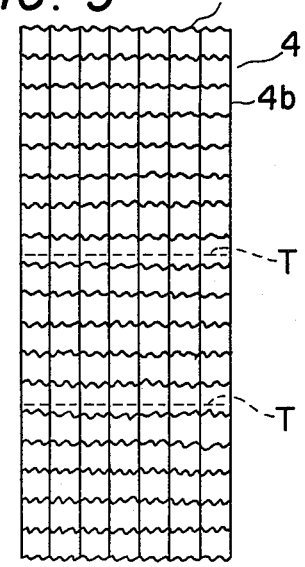
FIG. 3 is a plan view of a woven fabric employed in the V-belt according to the invention.
Figure 4:
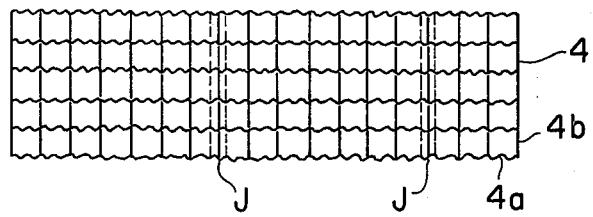
FIG. 4 is a plan view showing a fabric in FIG. 3 which has been rearranged to be used in the V-belt.

FIG. 3 shows one example of the fabric 4 employed in the V-belt according to the invention. The fabric 4 is a plain weave fabric obtained by weaving wefts 4a which are crimped nylon yarns subjected to wooly treatment and warps 4b which are cotton yarns, nylon yarns or polyester yarns. The plane weave fabric is cut along the dotted lines T into several pieces of fabric as shown in FIG. 3, which are joined together at the joint lines J as shown in FIG. 4 to form a long fabric. The long fabric thus formed is inserted in the belt in such a manner that the wefts 4a of the original plain weave fabric extend in the longitudinal direction of the belt, while the warps 4b of the original plain weave fabric extend in the lateral direction of the belt.

That is, a few plies of fabric (as shown in FIG. 4) obtained by exchanging the directions of the warps and wefts of the original fabric are embedded in the lower rubber layer 3' equal in quality to the compression rubber layer 3. As a result, the stretchability in the longitudinal direction of the belt and the rigidity in the lateral direction of the belt are increased.

In the above-described example, the fabric is a plain weave fabric; however, it should be noted that the same effect can be obtained by using a twill weave fabric instead of the plane weave fabric.

Figure 5:
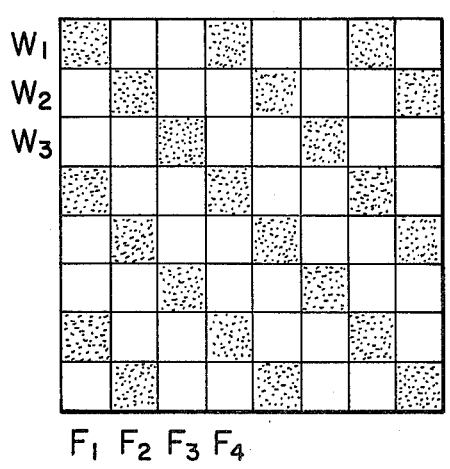
FIG. 5 is an explanatory diagram showing a woven pattern of a twill weave fabric employed in the V-belt according to the invention.

FIG. 5 shows a woven pattern of such a twill weave fabric used in the V-belt according to the invention. In FIG. 5, reference character W designates a warp which is a crimped nylon yarn subjected to wooly treatment, and reference character F designates a weft which is a cotton yarn, or nylon yarn. The first warp $W_1$ appears over the first weft $F_1$, disappears under the second and third wefts $F_2$ and $F_3$ and appears over the fourth weft $F_4$. The second warp $W_2$ disappears under the first weft $F_1$, appears over the second weft $F_2$, and disappears over the third and fourth wefts $F_3$ and $F_4$. The third warps disappear under the first and second wefts $F_1$ and $F_2$, and appear over the third weft $F_3$; and so forth.

If this woven pattern is viewed by standing on the side of the wefts, the weft $F_1$ disappears under the first warp $W_1$ and appears over the second and third warps $W_2$ and $W_3$. The weft $F_2$ appears over the warp $W_1$, disappears under the second warp $W_2$ and appears over the third and fourth warps $W_3$ and $W_4$. The third $W_3$ appears over the first and second warps $W_1$ and $W_2$ and disappears under the third warp $W_3$. Since the warps and the wefts are interlaced with one another this way, the positions of the appearing warps and wefts move stepwise downward to the right. As a result, a woven pattern having oblique lines which run downward to the right is obtained. That is, a so-called twill weave is obtained.

Accordingly, the number of cross points of the twill weave fabric is much smaller than that of the ordinary plain weave canvas. Therefore, the spaces between the yarns and between the cross points are sufficiently filled with the compression rubber 3'. Hence, the warps 4b are prevented from being brought into direct contact with the wefts 4a when the belt is bent, and therefore the service life of the belt is increased.

Figure 2:
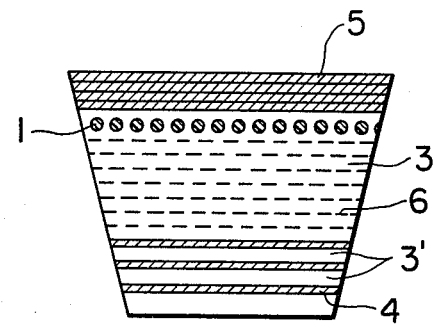
FIG. 2 is a cross-sectional view showing one modification of the V-belt shown in FIG. 1.

FIG. 2 shows one modification of the V-belt shown in FIG. 1. The lower portion of the belt, provided under the layer of a tensile member 1, is similar to that of the V-belt shown in FIG. 1. However, as is apparent from FIG. 2, the V-belt has no tension rubber layer 2 shown in FIG. 1. Instead, a wide cross-angle fabric 5 is bonded directly to the upper surface of the layer of the tensile member 1. Because a few plies of plain weave fabric or twill weave fabric 4 are embedded in the lower portion of the belt, the stretchability in the longitudinal direction of the belt is obtained while the rigidity in the lateral direction of the belt is improved.

In the above-described examples, the plain weave fabric or the twill weave fabric shown in FIGS. 3 and 4 is arranged in the lower portion of the belt in such a manner that the warps or wefts are at right-angles with the longitudinal direction of the belt. If the fabric is embedded in a raw edge type V-belt, the warps 4a of the fabric 4 shown in FIG. 4 (which were the wefts of the original canvas) are exposed, and therefore they may be frayed out of the belt. Accordingly, it is preferable that the fabric 4 is arranged in such a manner that the warps and wefts extend obliquely with respect to the longitudinal direction of the belt.

Figure 6:
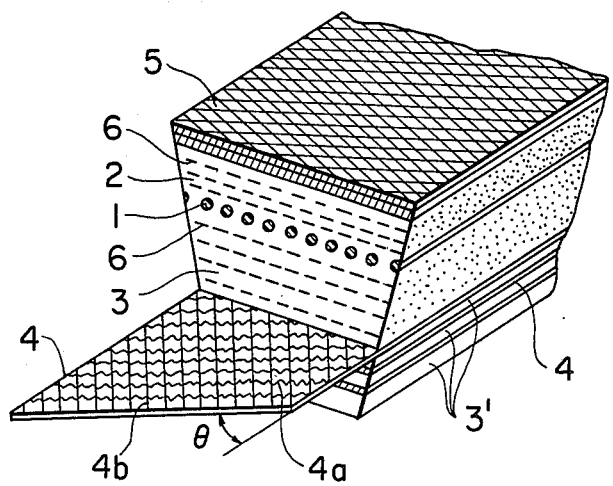
FIG. 6 is a perspective view, with parts cut away, showing another example of the V-belt according to the invention, in which the yarns of its fabric are arranged obliquely with respect to the longitudinal direction of the belt.

FIG. 6 is a perspective view showing another example of the V-belt according to the invention. Here, a few plies of fabric 4 are embedded therein in such a manner that the warps and wefts extend obliquely with respect to the longitudinal direction of the belt in order to prevent the warps 4a from being frayed out of the belt. The structure of the V-belt shown in FIG. 6 is similar to that of the V-belt shown in FIG. 1, with the exception of the arrangement of the fabric 4.

FIGS. 7 and 8 show the fabric used in the V-belt in FIG. 6. The fabric 4 shown in FIG. 7 is a plain weave fabric obtained by weaving wefts 4a which are crimped nylon yarns subjected to wooly treatment and warps 4b which are nylon yarns or polyester yarns, similar to the fabric shown in FIG. 3. The fabric 4 is cut along the dotted lines T', which form an angle θ with the wefts 4a, into several piece of fabric equal in width. These pieces of fabric are joined together as indicated by J' in FIG. 8 to obtain a long fabric, in which the warps 4a (which were the wefts of the original fabric) form the angle θ with the longitudinal direction of the long fabric.

A few plies of fabric 4 (FIG. 8) are embedded in the rubber layer 3' forming the lower portion of the belt as shown in FIG. 6 in such a manner that the crimped nylon yarns subjected to wooly treatment, i.e., the stretchable warps 4a (which were the wefts of the original fabric) form the angle θ with respect to the longitudinal direction of the belt. The angle of inclination θ is, in general, 0 to 40 degrees.

If the angle θ is larger than 40 degrees, then the direction of the stretchable warps 4a approaches the lateral direction of the belt and, as a result, the stretchability in the longitudinal direction of the belt is decreased. The rigidity in the lateral direction of the belt is also decreased. Thus, it is most suitable that the angle θ is in the range of 0 to 40 degrees. It is possible with this arrangement to prevent the warps 4a from being frayed out of the belt. The twill weave fabric shown in FIG. 5 can be used for the V-belt shown in FIG. 6. If, in this case, the twill weave fabric is rearranged into a long fabric as described above, then its desired effect can be expected.

The long plain weave fabric and the long twill weave fabric shown in FIGS. 4 and 8 are obtained by cutting the original fabrics shown in FIGS. 3 and 7 laterally and obliquely into several pieces of fabric and joining these pieces of fabric into long fabrics, respectively. Therefore, the joint parts J and J' are thicker than the other parts. If the long fabric is embedded in the belt, then the thickness of the belt becomes non-uniform, which may vibrate the belt.

This difficulty can be eliminated by using a plain weave fabric or a twill weave fabric which is obtained by weaving warps 4b which are crimped nylon yarns subjected to wooly treatment and wefts 4a which are nylon yarns or polyester yarns, as shown in FIG. 9. In the case of such a plain weave fabric or twill weave fabric, unlike the above-described fabric, it is unnecessary to cut the fabric into several pieces of fabric and to join them together. That is, it can be used as is.

In the case where the fabric 4 is embedded in lamination form in the rubber 3', a method is, in general, employed in which the fabric 4 bonded to the rubber layer 3' is spirally wound around a cylindrical drum. That is, the fabric 4 having no joint part is spirally wound to form fabric layers in the rubber 3'. Therefore, a V-belt uniform in thickness can be obtained.

In the above-described examples of the V-belt according to the invention, the plain weave fabric or the twill weave fabric obtained by weaving crimped nylon yarns subjected to wooly treatment and cotton yarns, nylon yarns or polyester yarns is arranged in the lower portion of the belt in such a manner that the crimped nylon yarns having a high stretchability extend in the longitudinal direction of the belt. However, it should be noted that the invention is not limited thereto or thereby. That is, the fabric may be bonded in lamination form only to the upper surface of the tension section of the belt, or the fabric may be bonded to or embedded in both of the upper and lower portions of the belt.

In the case of FIG. 10, the stretchability of the tension section of the belt is increased. More specifically, a single or plural plies of plain weave fabric or twill weave fabric 4 described above are bonded in lamination form to the upper surface of the tension rubber layer 2 in such a manner that the crimped nylon yarns subjected to wooly treatment extend in the longitudinal direction of the belt. The rigidity in the lateral direction of the belt can be increased by short fibers 6 which are mixed in the tension rubber layer 2 and the compression rubber layer 3 in such a manner that the short fibers 6 extend laterally of the belt.

In the case of FIG. 10, the stretchability of the tension section is sufficient, but the flexibility of the lower portion of the belt is insufficient. This difficulty can be overcome by forming the compression rubber layer 3 as shown in FIG. 11. That is, grooves G are formed in the lower portion of the compression rubber layer 3 to provide cogs C. As a result, the flexibility of the lower portion of the belt is increased, and it is possible to prevent the belt from cracking.

In the case where it is required to increase the stretchability and the rigidity in the lateral direction or the belt for both of the tension section 2 and the compression section 3, the requirement can be satisfied by modifying the belt as shown in FIG. 12. That is, the stretchable fabric 4 is bonded in lamination form to the upper surface of the tension rubber layer 2, and a single or plural plys of similar stretchable fabric 4 are embedded in lamination form in the lower portion 3' of the compression rubber layer 3.

In the V-belt shown in FIGS. 10, 11 and 12 also, the stretchable fabric 4 may be arranged not only in such a manner that the yarns are right-angled with the longitudinal direction of the belt but also in such a manner that the warps form an angle of 0 to 40 degrees with the longitudinal direction of the belt. Furthermore, it is apparent that the fabric having no joint part as shown in FIG. 9 can be employed as is.

The raw edge type rubber V-belt according to the invention thus constructed has the following various merits and features:

(1) Since the nylon yarns subjected to wooly treatment are arranged in the longitudinal direction of the belt, the flexibility in the longitudinal direction of the belt is increased, and it is possible to positively prevent the belt from cracking.

(2) The cotton yarns, nylon yarns, or polyester yarns are arranged in the lateral direction of the belt, and the short fibers are mixed in the rubbers layers in such a manner that they extend in the lateral direction of the belt. Therefore, the side pressure durability of the belt is improved. It is therefore possible to prevent the belt from dropping in a pulley during the run.

(3) The rubber layers are interposed between the fabric layers, and serve as cushion members. Therefore, the service life of the belt is increased.

(4) The fabric is bonded or embedded in such a manner that the warps form an angle of 0 to 40 degrees with respect to the longitudinal direction of the belt. Therefore, it is possible to prevent the warps from being frayed out of the belt.

(5) Since the fabric is obtained by weaving warps which are crimped nylon yarns subjected to wooly treatment and wefts which are cotton yarns, nylon yarns or polyester yarns is employed, it is possible to form laminated fabric layers with no joint parts. As a result vibration of the belt can be prevented.

(6) Thus, the V-belt according to the invention can satisfy the various conditions required for a V-belt, to improve the power transmission performance.

What is claimed is:

1. A raw edge type rubber V-belt comprising; a tension section, a compression section, a tensile member layer extending in the longitudinal direction of said belt and embedded between said tension section and said compression section, said tensile member layer positioned away from the V-belt central neutral axis thereby defining an unsymmetrical construction, at least one ply of rubbered fabric highly stretchable in the longitudinal direction of said belt having in lamination form a rubber layer and a twill weave fabric with crimped nylon wefts subjected to wooly treatment, short fibers mixed in a compression rubber layer under said tensile member layer and, a tension rubber layer over said tensile member layer having short fibers mixed therein extending in the lateral direction of said belt.

2. A V-belt as claimed in claim 1, wherein said fabric is embedded in the lower portion of said compression section and said wefts and warps extend in the longitudinal and lateral direction of said belt, respectively.

3. A V-belt as claimed in claim 1, wherein said twill weave fabric with woven warps comprises cotton yarns, nylon yarns or polyester yarns and, said fabric is embedded in the lower portion of said compression section whereby said wefts and warps extend in the longitudinal and lateral directions of said belt, respectively.

4. A V-belt as claimed in claim 1, wherein said fabric is embedded in the lower portion of said compression section in with said crimped nylon yarns forming an angle of 0 to 40 degrees with respect to the longitudinal direction of said belt.

5. A V-belt as claimed in claim 1, wherein said fabric is bonded to the upper surface of said tension section with said warps and wefts extending in the longitudinal and lateral directions of said belt, whereby formation of joints of said fabric is avoided.

6. A V-belt as claimed in claim 1, wherein said rubbered twill weave fabric comprises cotton yarns, nylon yarns or polyester yarns, and said fabric is bonded to the upper surface of said tension section with said warps and wefts extending in the longitudinal and lateral directions of said belt, and formation of joints of said fabric is avoided.

7. A V-belt as claimed claims 1, 2, 3, 4, 5 or 6 wherein fabric on the upper surface of said tension section is obtained weaving warps and wefts which are cotton yarns in such a manner that said warps and wefts form a cross-angle of 90 to 150 degrees, and are bonded in bias form to the upper surface of said tension section.

8. A V-belt as claimed in claim 7 wherein said rubbered fabric comprises two to five plies.

9. A V-belt as claimed in claims 1, 2, 3, 4, 5 or 6 wherein said rubbered fabric comprises two to five plies.

* * * * *